(12) United States Patent
Bonneville et al.

(10) Patent No.: US 10,507,626 B2
(45) Date of Patent: Dec. 17, 2019

(54) BLADDER DEVICES FOR MOVING COMPONENTS OF WEB PACKAGING MACHINES

(71) Applicant: Alkar-RapidPak, Inc., Lodi, WI (US)

(72) Inventors: Craig R. Bonneville, Black Earth, WI (US); Erik J. Ebert, Stoughton, WI (US); Daryl W. Shackelford, Waunakee, WI (US)

(73) Assignee: Alkar-RapidPak, Inc., Lodi, WI (US)

( * ) Notice: Subject to any disclaimer, the term of this patent is extended or adjusted under 35 U.S.C. 154(b) by 240 days.

(21) Appl. No.: 15/593,866

(22) Filed: May 12, 2017

(65) Prior Publication Data

US 2017/0326828 A1    Nov. 16, 2017

Related U.S. Application Data

(60) Provisional application No. 62/336,971, filed on May 16, 2016.

(51) Int. Cl.
*B30B 1/00* (2006.01)
*B30B 5/02* (2006.01)
(Continued)

(52) U.S. Cl.
CPC ............ *B30B 1/003* (2013.01); *B29C 66/131* (2013.01); *B29C 66/82421* (2013.01); *B30B 5/02* (2013.01); *F16B 5/0692* (2013.01)

(58) Field of Classification Search
CPC ........... B30B 1/003; B30B 5/02; B65B 47/00; B65B 7/162; B65B 9/04; B29L 2031/712;
(Continued)

(56) References Cited

U.S. PATENT DOCUMENTS

| 2,015,070 A | 9/1935 | Flint |
| 2,500,531 A * | 3/1950 | Eger ..................... B60C 29/04 |
| | | 152/429 |

(Continued)

FOREIGN PATENT DOCUMENTS

| DE | 807485 | 6/1951 |
| DE | 1245585 | 7/1967 |

(Continued)

OTHER PUBLICATIONS

European Search Report and Written Opinion, EP Patent Application No. 17171346.4, dated Oct. 18, 2017.

*Primary Examiner* — Jimmy T Nguyen
(74) *Attorney, Agent, or Firm* — Andrus Intellectual Property Law, LLP

(57) ABSTRACT

A bladder device is for moving a component of a web packaging machine that forms and encloses a food product in a food product package made of webs of packaging material. The bladder device has a bladder and a nipple stub coupled to the bladder and having a first end configured to receive a gas and a second end configured to dispense the gas into the bladder to thereby inflate the bladder and move the component of the web packaging machine. A collar coupled to the nipple stub such that the bladder is sandwiched between the collar and the second end of the nipple stub. The second end of the nipple stub has a depression and the collar has a boss that is oriented towards the depression such that tightening the collar on the nipple stub forces the bladder into the depression and thereby forms a fluid tight seal.

7 Claims, 7 Drawing Sheets

(51) Int. Cl.
*B29C 65/00* (2006.01)
*F16B 5/06* (2006.01)

(58) Field of Classification Search
CPC ............... B29C 66/112; B29C 66/131; B29C 66/53461; B29C 66/82421; B29C 66/8322; B29C 66/849; F16B 5/0692; B60C 29/04
USPC .................. 100/211, 269.05; 53/559, 453
See application file for complete search history.

(56) References Cited

U.S. PATENT DOCUMENTS

| | | | | |
|---|---|---|---|---|
| 2,877,801 A * | 3/1959 | Mercier | ............. | B60C 29/04 |
| | | | | 138/30 |
| 2,975,476 A * | 3/1961 | Burke | ............. | B29C 33/04 |
| | | | | 100/211 |
| 3,017,308 A * | 1/1962 | Pond | ............. | B60C 29/04 |
| | | | | 156/120 |
| 3,661,683 A * | 5/1972 | Engel | ............. | B29C 73/00 |
| | | | | 100/211 |
| 5,205,110 A | 4/1993 | Buchko | | |
| 8,186,134 B2 | 5/2012 | Shackelford et al. | | |
| 8,499,536 B2 | 8/2013 | Bonneville | | |

FOREIGN PATENT DOCUMENTS

| | | |
|---|---|---|
| GB | 13467 | 3/1911 |
| GB | 387236 | 2/1933 |

* cited by examiner

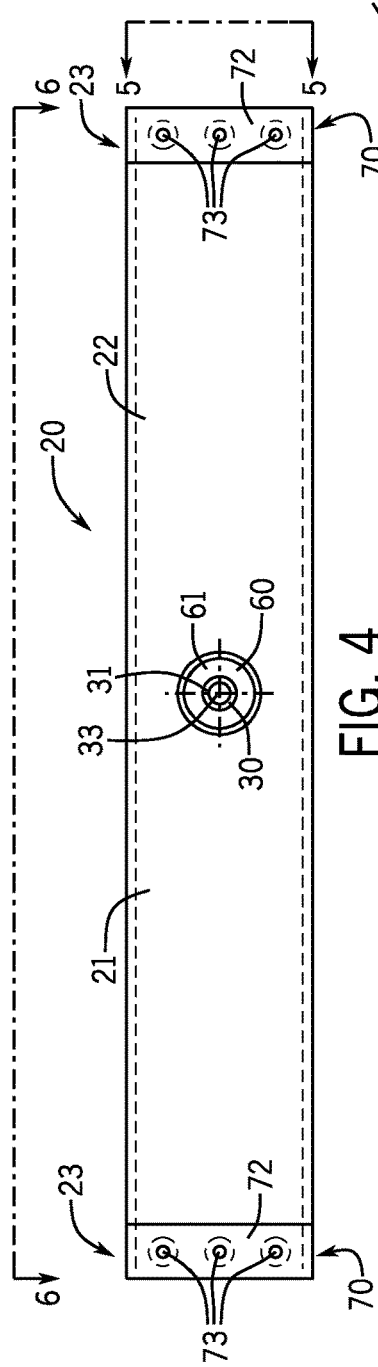
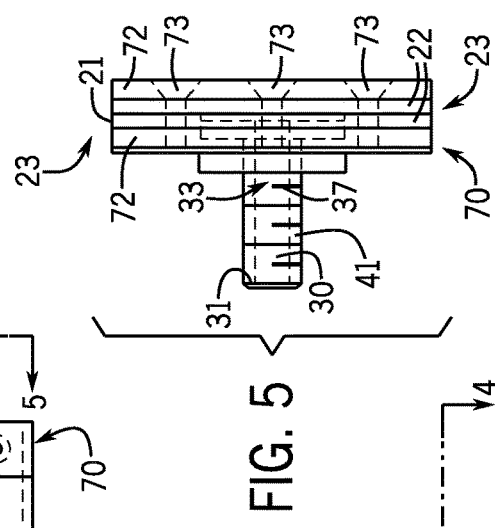
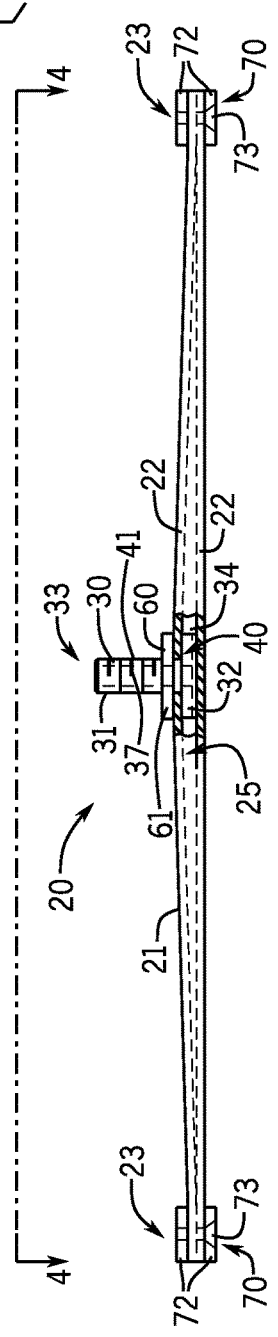

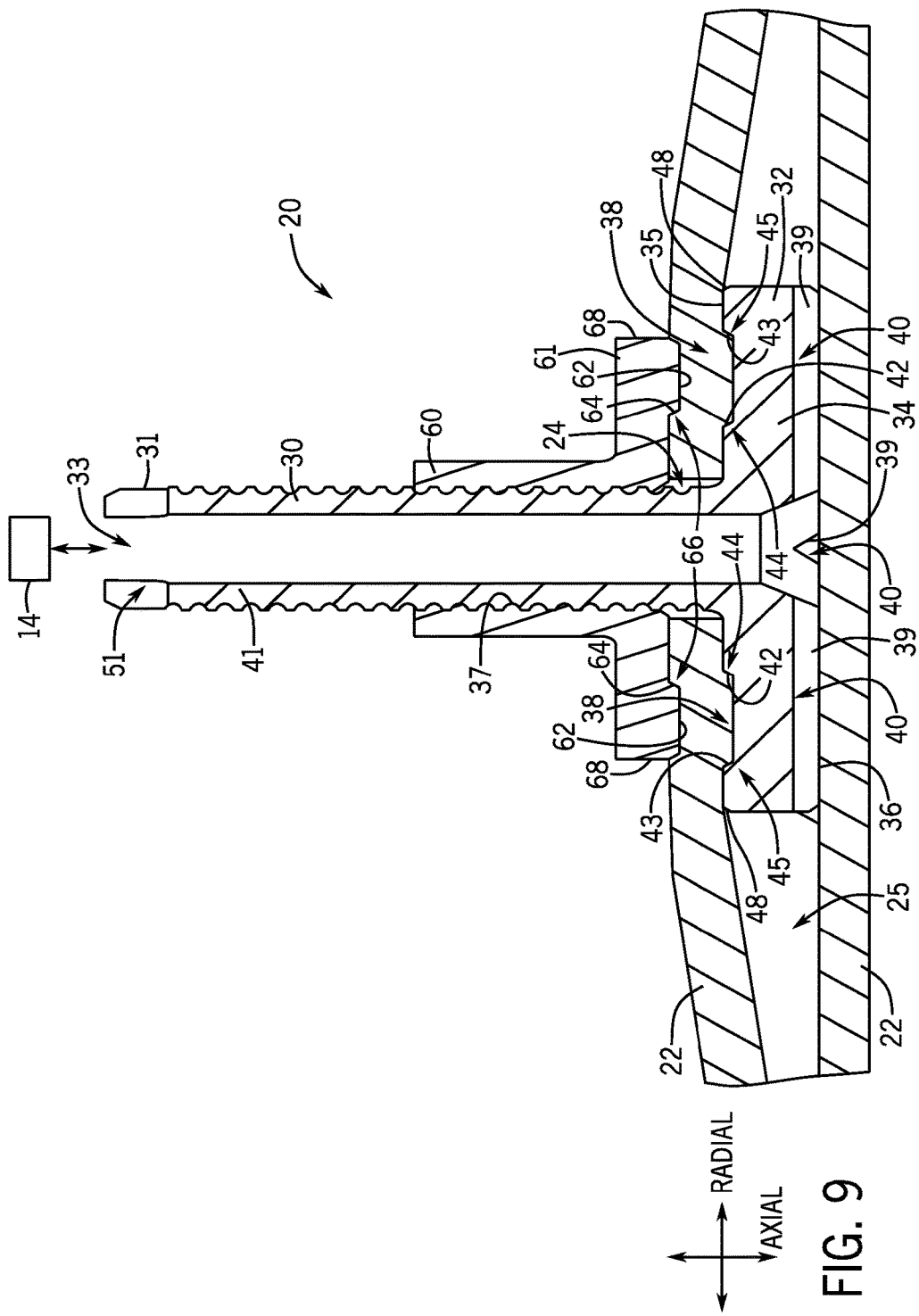

BLADDER DEVICES FOR MOVING COMPONENTS OF WEB PACKAGING MACHINES

CROSS-REFERENCE TO RELATED APPLICATION

The present application is based on and claims priority to U.S. Provisional Patent Application Ser. No. 62/336,971 filed May 16, 2016, the disclosure of which is incorporated herein by reference.

FIELD

The present disclosure relates to bladder devices for moving components of web packaging machines.

BACKGROUND

The following U.S. patents are incorporated herein by reference in entirety.

U.S. Pat. No. 5,205,110 discloses an indexing motion apparatus and method for vacuum packaging of articles such as hot dogs, sliced luncheon meat, cheese or pharmaceuticals. A lower web of packaging material is indexingly advanced by a lower web drive driven in an indexing manner by a servo motor. Forming tooling is provided for vacuum forming the lower web to form one or more product cavities and the forming tooling is movable between raised and lowered positions by a lifting and lowering system driven by a servo motor. After the formed product cavities are loaded with product, the cavities are evacuated and an upper web applied to vacuum package the product. A slitting mechanism severs the upper and lower webs into individual product packages. The servo motors are programmable and provide accurate position of the components of the packaging machine, and also provide ease in changing the various parameters of the packaging machine according to the type of product being packaged.

U.S. Pat. No. 8,186,134 discloses packaging machines that include a web transport conveyor for transporting a web of flexible packaging material from upstream to downstream locations through a series of stations and packaging apparatuses. A forming station and a closing station each have movable die members that are counterbalanced.

U.S. Pat. No. 8,499,536 discloses packaging machines that include a web transport conveyor transporting a web of flexible packaging material from upstream to downstream locations through a series of stations.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples disclosed herein, a bladder device is for moving a component of a web packaging machine. The web packaging machine is configured to enclose a food product in a food product package made of lower and upper webs of packaging material. The bladder device has a bladder, a nipple stub coupled to the bladder and having a first end configured to receive a gas and an opposite, second end configured to dispense the gas into the bladder to thereby inflate the bladder and move the component of the web packaging machine, and a collar coupled to the nipple stub. The bladder is sandwiched between the collar and the second end of the nipple stub. Either the second end of the nipple stub or the collar has a depression and the other of the second end of the nipple stub and the collar has a boss that is oriented towards the depression such that tightening the collar on the nipple stub forces the bladder into the depression and thereby forms a fluid tight seal.

Various other features, objects, and advantages will be made apparent from the following description taken together with the drawings.

BRIEF DESCRIPTION OF THE DRAWINGS

The present disclosure includes the following Figures. The same numbers are used throughout the Figures to reference like features and like components.

FIG. 4 is a top view of a bladder device according to the present disclosure.

FIG. 5 is an end view of the bladder device of FIG. 4 taken along line 5-5 of FIG. 4.

FIG. 6 is a side view of the bladder device of FIG. 4 taken along line 6-6 of FIG. 4.

FIG. 9 is a partial cross section view of another example of the bladder device according to the present disclosure, showing the bladder device in a deflated condition.

DETAILED DESCRIPTION OF THE DRAWINGS

In the present description, certain terms have been used for brevity, clarity and understanding. No unnecessary limitations are to be inferred therefrom beyond the requirement of the prior art because such terms are used for descriptive purposes only and are intended to be broadly construed. The different devices described herein may be used alone or in combination with other devices. Various equivalents, alternatives and modifications are possible within the scope of the appended claims.

Figure 1:
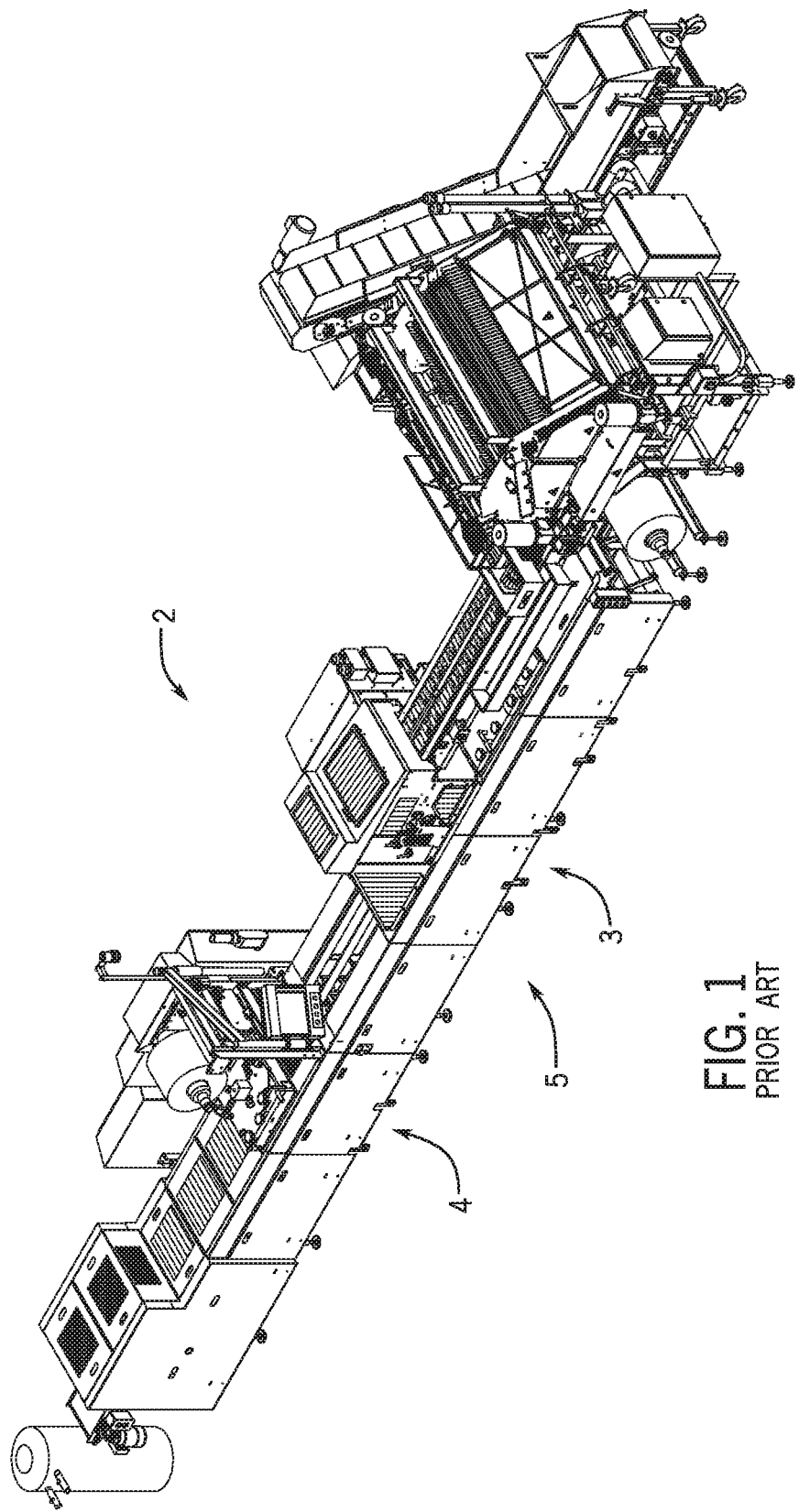
FIG. 1 is an example of a prior art web packaging machine.

FIG. 1 depicts a prior art web packaging machine 2, such as is disclosed in the above-incorporated U.S. patents. As disclosed in those patents, the web packaging machine 2 is configured to form a food product package from lower and upper webs of flexible packaging material. A web transport conveyor is configured to transport a lower web of packaging material from upstream to downstream through a series of stations. A forming station 3 forms a food product cavity in the lower web. A filling station 5 fills the food product cavity with food product. A closing or sealing station 4 encloses the food product in the food product cavity by sealing the upper web to the lower web, thereby forming the food product package. Optionally, a cutting station cuts the upper and lower webs into separate food product packages.

It is known to equip the web packaging machine 2 with one or more inflatable bladder devices configured to move components of the web packaging machine 2 into and out of position. Generally, a supply of pressurized gas is connected to the bladder device. Inflating the bladder device causes it to expand, which forces the noted component out of its position. Deflating the bladder device causes it to retract, which allows gravity or another biasing force such as a spring to force the noted component back into position. Such inflatable bladder devices are often utilized in the packaging industry to selectively move die boxes in the forming station 3, die boxes in the sealing station 4, and/or sealing heads or plates at the sealing station 4 for sealing the upper and lower webs together. One example of an arrangement where a bladder device is configured to move a component of a web packaging machine is disclosed in U.S. Pat. No. 8,186,134. These and other concepts will also become more apparent from the following description.

During research and experimentation, the present inventors have realized that conventional bladder devices can often be prone to material failure (e.g., the bladders can rupture during use). Conventional bladder devices are often formed by clamping devices and/or adhesives which can fail and/or deteriorate over time. Upon this realization, the present inventors have endeavored to provide improved bladder devices that are more durable and that operate more efficiently.

FIGS. 4-8 depict a first example of a bladder device 20 according to the present disclosure. The bladder device 20 includes a bladder 21 having a sidewall 22 and a pair of opposite ends 23. An opening 24 (FIG. 7) is formed through the sidewall 22 and facilitates flow of pressurized gas into and out of an interior space 25 in the bladder 21. The bladder 21 is clamped at the ends 23 by respective clamps 70, each having screws 73 that clamp together a pair of plates 72. The plates 72 are configured to sandwich opposing sections of the sidewalls 22.

A nipple stub 30 is disposed in the opening 24 in the bladder 21 and is connected to the sidewall 22. The nipple stub 30 has a first end 31 that is configured for connection to a gas source 14, via for example an air conduit 17 (see FIGS. 2-3). The nipple stub 30 has a second end 32 that is configured to dispense the gas into the interior space 25 of the bladder 21 to thereby inflate the bladder 21. A bore 33 extends from the first end 31 to the second end 32. Screw threads 37 on the exterior of an elongated stub shaft 41, between the opposite ends 31, 32, facilitate connection to a collar 60, which will be described further herein below. In certain examples, the first end 31 of the nipple stub 30 includes a notch 51 configured for engagement by a conventional manual or power tool (not shown) to rotate the nipple stub 30 with respect to the collar 60, as will be further described herein below. Relative rotation of the nipple stub 30 with respect to the collar 60 in a first direction couples the nipple stub 30 to the collar 60. Relative rotation of the nipple stub 30 in an opposite, second direction uncouples the nipple stub 30 from the collar 60.

The second end 32 of the nipple stub 30 includes a nipple stub flange 34 having first (top) surface 35 on which a depression 38 is formed and an opposite, second (bottom) surface 36 on which a groove 39 is formed. The groove 39 radially outwardly extends from the bore 33 and defines a fluid path 40 through which the gas can flows from the gas source 14 into the interior space 25. The size and/or shape of the nipple stub flange 34 and/or the depression 38 can vary. In some examples, the nipple stub flange 34 is annular and the depression 38 is also annular. The number of grooves 39 can also vary from what is shown.

Figure 8:
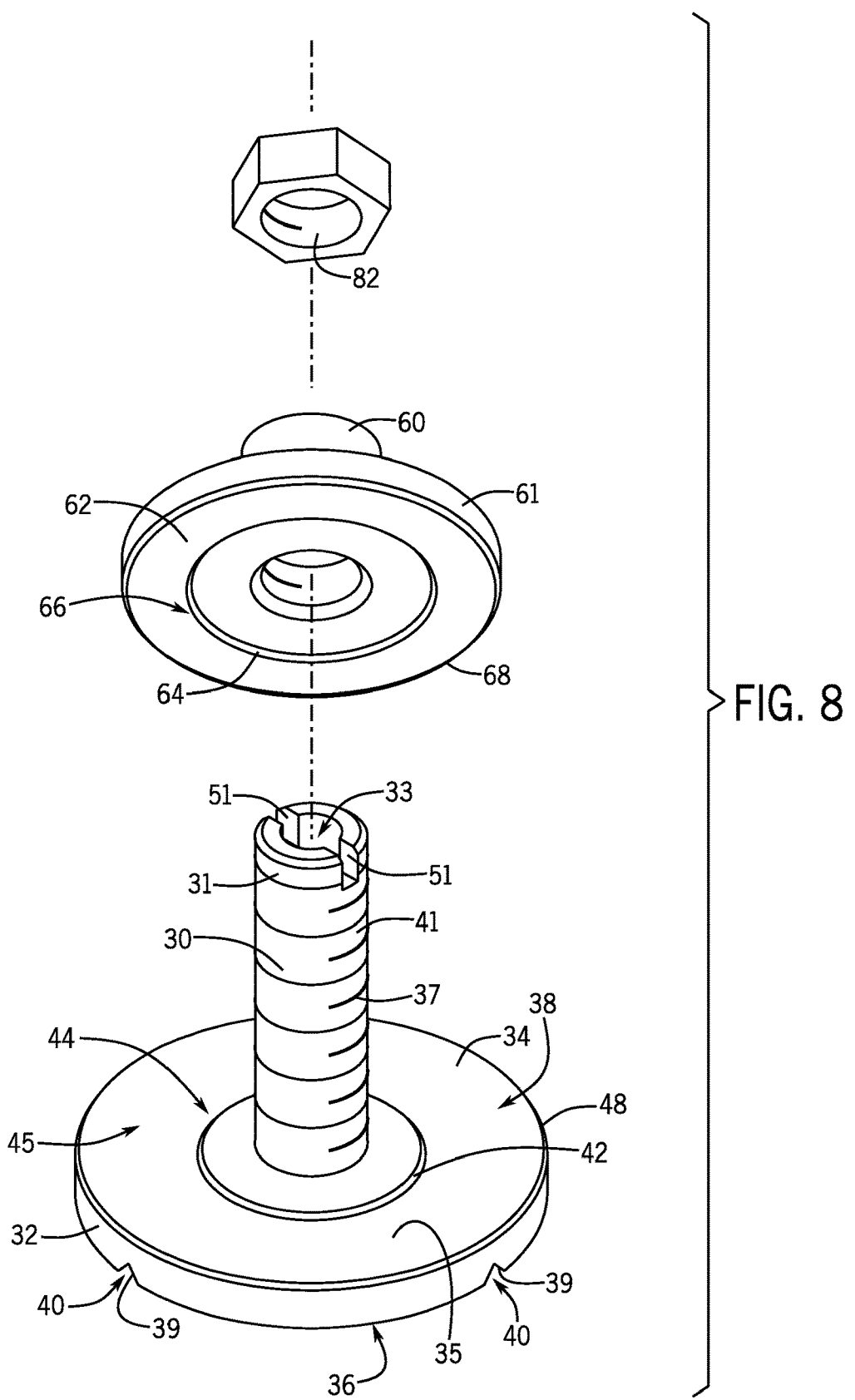
FIG. 8 is an exploded view of a lock nut, collar, and nipple stub for the bladder device.

Referring to FIG. 8, the nipple stub flange 34 has a sloped surface 42 located on a radially inner, first side 44 of the depression 38. The sloped surface 42 is positioned radially inwardly relative to an outer perimeter edge 48 of the nipple stub flange 34. The depression 38 extends from the sloped surface 42 to the outer perimeter edge 48 of the nipple stub flange 34.

Conversely, in the example shown in FIG. 9, the nipple stub flange 34 also has a second sloped surface 43 positioned between the first sloped surface 42 and the outer perimeter edge 48 at a second side 45 of the depression 38. In this example, the depression 38 extends between the first and second sloped surfaces 42, 43.

Referring back to FIGS. 4-8, the bladder device 20 also includes the collar 60, which as explained above is coupled to and uncoupled from the nipple stub 30 via the threaded connection. Tightening the collar 60 onto the nipple stub 30 sandwiches the sidewall 22 of the bladder 21 between the collar 60 and the second end 32 of the nipple stub 30. The collar 60 has a boss 62 that is orientated towards the depression 38 such that tightening the collar 60 onto the nipple stub 30 forces the sidewall 22 into the depression 38 and thereby forms a fluid tight seal there between. The size, shape, and/or orientation of the boss 62 can vary, and in one example, the collar 60 annular and the boss 62 is an annular boss that is sized to fit in the depression 38.

Referring to FIG. 8, the collar 60 has a sloped surface 64 on a first side 66 of the boss 62 that roughly corresponds to the sloped surface 42 on the nipple stub flange 34. The first side 66 is positioned radially inwardly relative to an outer perimeter edge 68 of the collar 60. The boss 62 extends between the first side 66 and the outer perimeter edge 68. In certain examples, the collar 60 comprises a collar flange 61 having a second radius R2 that is less than a first radius R1 of the nipple stub flange 34 of the nipple stub 30. The depression 38 and/or the boss 62 can be positioned on either of the nipple stub 30 and the collar 60.

In some examples, the bladder device 20 also includes a lock nut 82 that is configured to couple to the nipple stub 30 via threaded connection. The lock nut 82 can be axially positioned along the nipple stub 30 relative to the collar 60 and configured to prevent the collar 60 from axially moving along the nipple stub 30.

Figure 2:
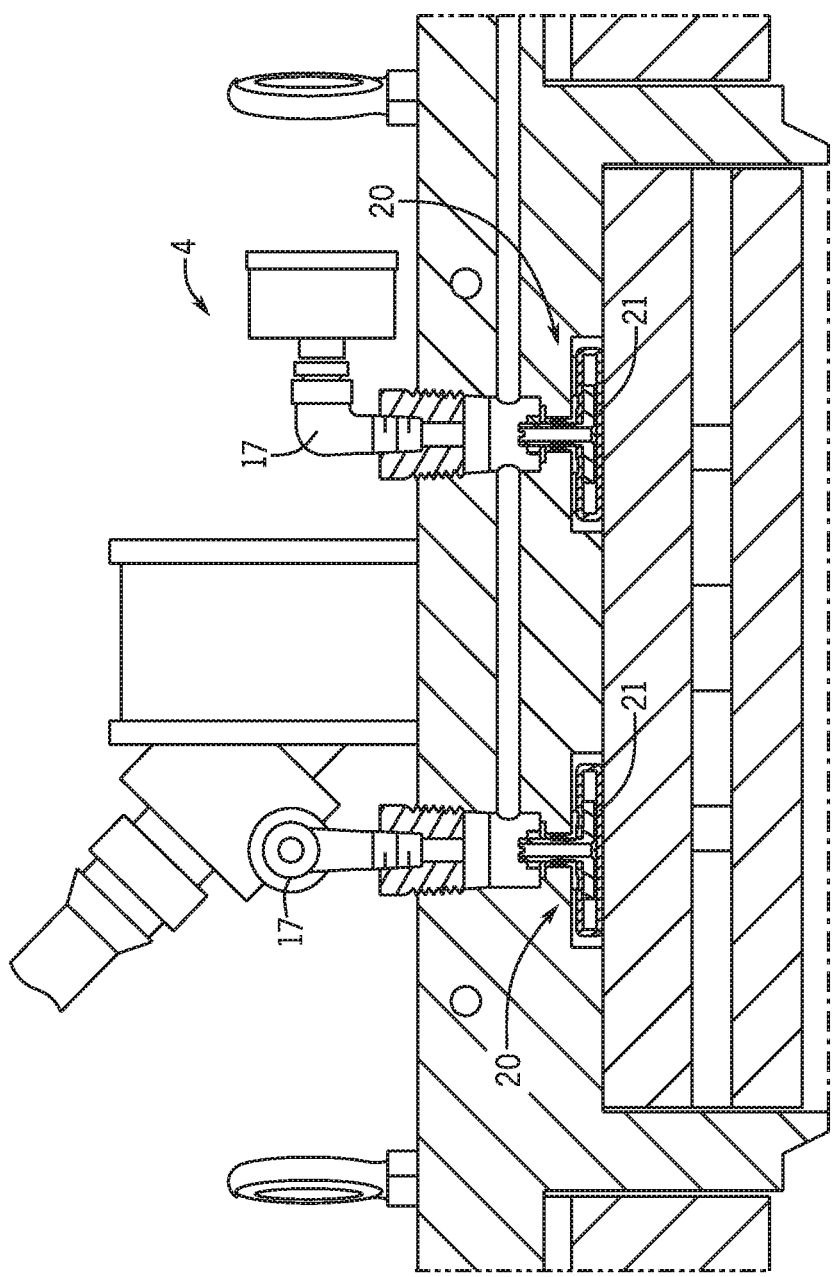
FIG. 2 is a partial cross section at a sealing station for the web packaging machine shown in FIG. 1. Two bladder devices configured according to the present disclosure are depicted in a deflated condition. The bladder devices are configured to move a seal bar which seals an upper web of packaging material to a lower web of packaging material, as is conventional.
Figure 3:
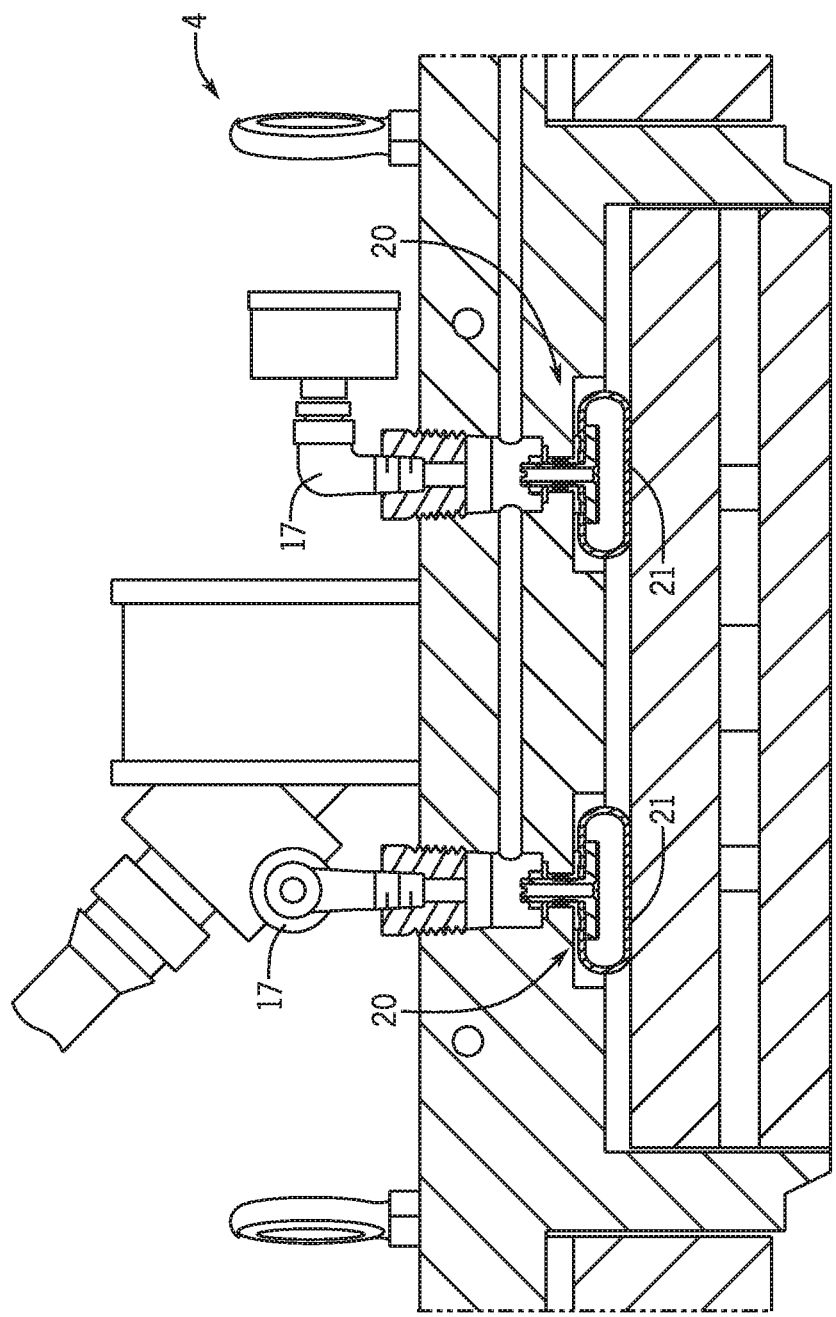
FIG. 3 is a view like FIG. 2 except it shows the pair of bladder devices in an inflated condition.
Figure 7:
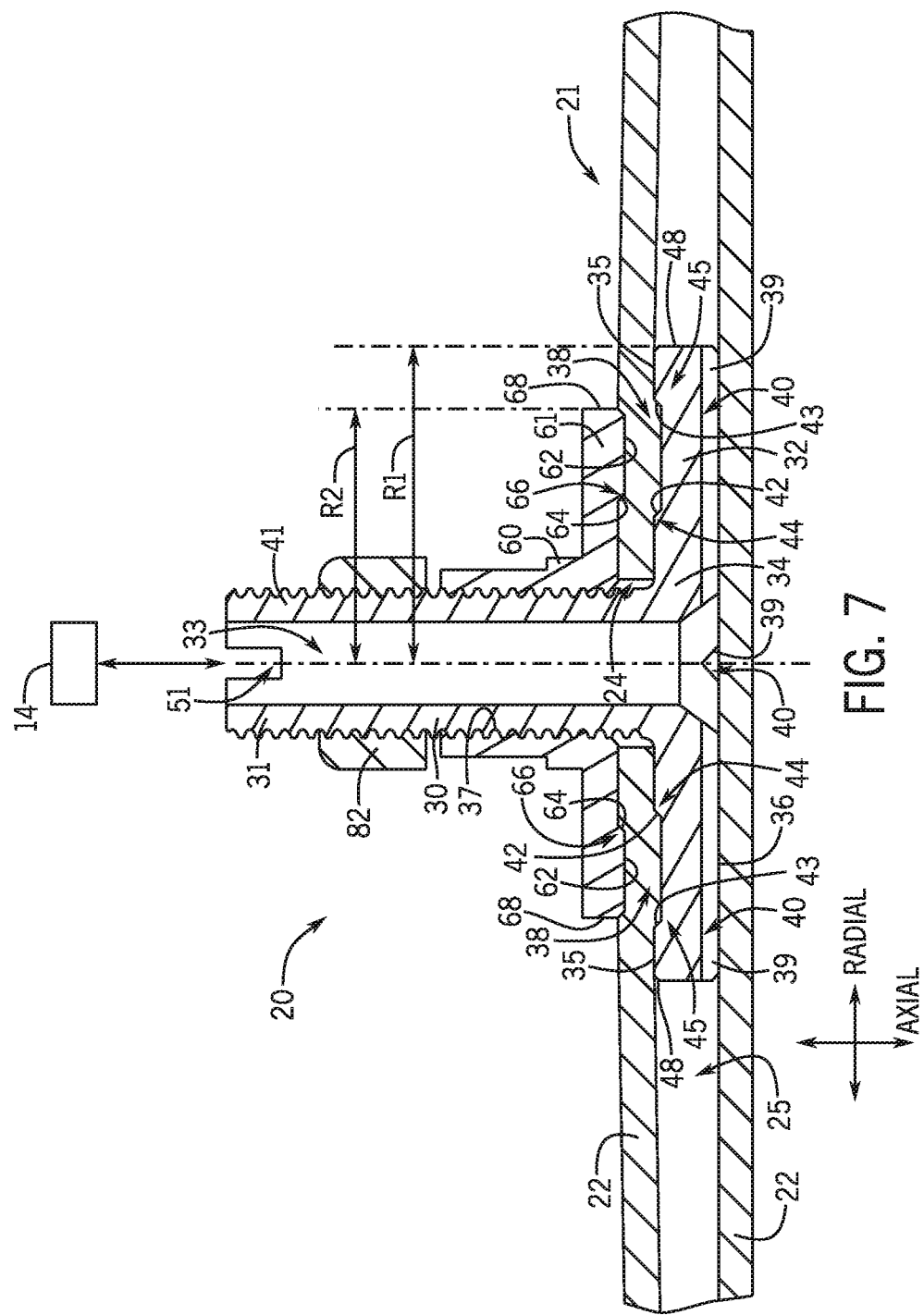
FIG. 7 is a partial cross section view of the bladder device, showing the bladder device in a deflated condition.

The bladder devices 20 according to the present disclosure can be positioned at different locations on the web packaging machine 2 to move different components of the web packaging machine 2, as described herein above. Referring to FIGS. 2 and 3, for example, the bladder devices 20 of the present disclosure can replace the conventional bladder devices 15 at a lifting assembly 16 for the respective sealing and or forming dies. In use, the bladder device 20 is connected to the gas source 14 and the bladders 21 are selectively inflated and deflated as gas is supplied to and removed from the bladders 21. As the bladders 21 inflate and deflate, the bladders 21 move the noted components of the web packaging machine 2, all as described herein above.

The present disclosure thus provides bladder devices for moving a component of a web packaging machine. The bladder device has a bladder; a nipple stub coupled to the bladder and having a first end configured to receive a gas and an opposite, second end configured to dispense the gas into the bladder to thereby inflate the bladder and move the component of the web packaging machine; and a collar coupled to the nipple stub. The bladder is sandwiched between the collar and the second end of the nipple stub.

Either the second end of the nipple stub or the collar has a depression and the other of the second end of the nipple stub and the collar has a boss that is oriented towards the depression such that tightening the collar on the nipple stub forces the bladder into the depression and thereby forms a fluid tight seal.

In certain examples, the depression is an annular depression and the boss is an annular boss that is sized to fit in the annular depression. The collar is coupled to the nipple stub via a threaded connection. The nipple stub has a bore configured to convey the gas from the first end to the second end. The second end of the nipple stub comprises a nipple stub flange and the collar comprises a collar flange. The bladder has a sidewall that is sandwiched between the nipple stub flange and the collar flange when the collar is tightened on the nipple stub. A groove is formed in the nipple stub flange. The groove radially extends from the bore and forms a fluid path along which the gas flows to inflate the bladder. The nipple stub flange has a first radius, and the collar has a collar flange with a smaller, second radius. The nipple stub flange has a sloped surface that defines a first side of the depression. The nipple stub flange has an outer perimeter edge, and the annular depression extends to the outer perimeter edge. In the example shown in FIG. 9, the nipple stub flange has another sloped surface that defines a radially outer side of the depression. The bladder defines an interior space, and the sidewall defines an opening through which the gas passes into the interior space.

It should be noted that the concepts of the present disclosure are applicable to a wide variety of bladder device configurations. That is, the concepts of the present invention are not limited to the particular example shown in the drawings. For example, the size and shape of the bladder can vary. The bladder can be formed from any suitable material such as plastic, rubber, and/or fabric. In some examples, the bladder can be formed from a length of conventional tubular fire hose made of fabric and rubber.

What is claimed is:

1. A bladder device for moving a component of a web packaging machine, the web packaging machine being configured to enclose a food product in a food product package made of lower and upper webs of packaging material, the bladder device comprising:

a bladder having a sidewall;

a nipple stub coupled to the bladder and having a first end configured to receive a gas and an opposite, second end configured to dispense the gas into the bladder to thereby inflate the bladder and move the component of the web packaging machine, wherein the nipple stub has a bore that extends between the first end and the second end and through which the gas is conveyed, and wherein the second end has a nipple stub flange with a plurality of grooves formed therein such that each groove in the plurality of grooves radially extends from the bore to an outer perimeter edge of the nipple stub flange to thereby form fluid flow paths along which the gas is conveyed; and a collar coupled to the nipple stub, wherein the sidewall of the bladder is sandwiched between the collar and the second end of the nipple stub, and wherein one of the second end of the nipple stub and the collar has a depression and the other of the second end of the nipple stub and the collar has a boss that is oriented towards the depression such that tightening the collar on the nipple stub forces the sidewall of the bladder into the depression and thereby forms a fluid tight seal;

wherein one of the nipple stub and the collar has a first sloped surface at a first side of the depression and an opposite second sloped surface at a second side of the depression; and wherein the other of the nipple stub and the collar has a first sloped surface at a first side of the boss that corresponds to the first sloped surface at the first side of the depression such that the boss fits within the depression.

2. The bladder device according to claim 1, wherein the depression is an annular depression and wherein the boss is an annular boss that is sized to fit in the annular depression.

3. The bladder device according to claim 2, wherein the collar is coupled to the nipple stub via a threaded connection.

4. The bladder device according to claim 3, wherein the collar comprises a collar flange, and wherein the sidewall is sandwiched between the nipple stub flange and the collar flange when the collar is tightened onto the nipple stub.

5. The bladder device according to claim 4, wherein the nipple stub flange has a first radius, and wherein the collar flange has a smaller, second radius.

6. The bladder device according to claim 5, wherein the annular depression extends to the outer perimeter edge.

7. The bladder device according to claim 4, wherein the bladder defines an interior space, and wherein the sidewall defines an opening through which the gas passes into the interior space.

* * * * *